(12) United States Patent
Kubo et al.

(10) Patent No.: US 6,215,602 B1
(45) Date of Patent: Apr. 10, 2001

(54) LENS HOLDING DEVICE FOR PORTABLE COMMUNICATION DEVICE

(75) Inventors: Tetsuya Kubo; Makoto Tamaru, both of Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/469,547

(22) Filed: Dec. 22, 1999

(30) Foreign Application Priority Data

Dec. 28, 1998 (JP) .................................................. 10-373785

(51) Int. Cl.[7] ........................................................ G02B 7/02
(52) U.S. Cl. ............................................. 359/808; 359/819
(58) Field of Search .................................... 359/808, 809, 359/819; 455/550, 575, 567, 90

(56) References Cited

U.S. PATENT DOCUMENTS 5,146,620 * 9/1992 Swikle ................................. 455/351
5,251,117 * 10/1993 Nagai ................................... 362/311

FOREIGN PATENT DOCUMENTS

411017996 * 1/1999 (JP) ............................... H04N/5/225

* cited by examiner

*Primary Examiner*—Georgia Epps
*Assistant Examiner*—Saeed H Seyrafi
(74) *Attorney, Agent, or Firm*—Pearne & Gordon LLP (57) ABSTRACT

The present invention is for providing portable communication device capable of reducing leakage of a light from the gap between a housing and the lens, improving the assembly property by simplifying the parts size administration and improving the holding strength of the lens in a portable phone comprising a lens for guiding a light from a light emitting member for advising receipt of call to the outside of the housing. A light transmitting portion, a collar portion, and a fitting spring portion are formed in a lens. The collar portion and the fitting spring portion are interposed between a flat portion formed in a housing and an LCD panel. An engaging projection formed on the rear surface of the LCD panel is inserted through the fitting spring portion.

4 Claims, 8 Drawing Sheets

LENS HOLDING DEVICE FOR PORTABLE COMMUNICATION DEVICE

BACKGROUND OF THE INVENTION

1. Field of the Invention

The present invention relates to portable communication devices, such as a portable phone and an individual calling radio, in particular, to a holding device of a lens for optically indicating receipt.

2. Description of the Related Art

Some portable communication devices, such as portable phones and individual calling radios, inform an user of arrival of electric waves transmitted from someone by flashing an a light emitting member. Such a portable communication device is the well-known device, which has a configuration that light emitted from the light emitting member is guided to the outside of a housing via a lens provided at one end of the housing Hereinafter, a configuration of the lens and a method of fixing the lens to the housing will be described with reference to drawings.

Figure 7:
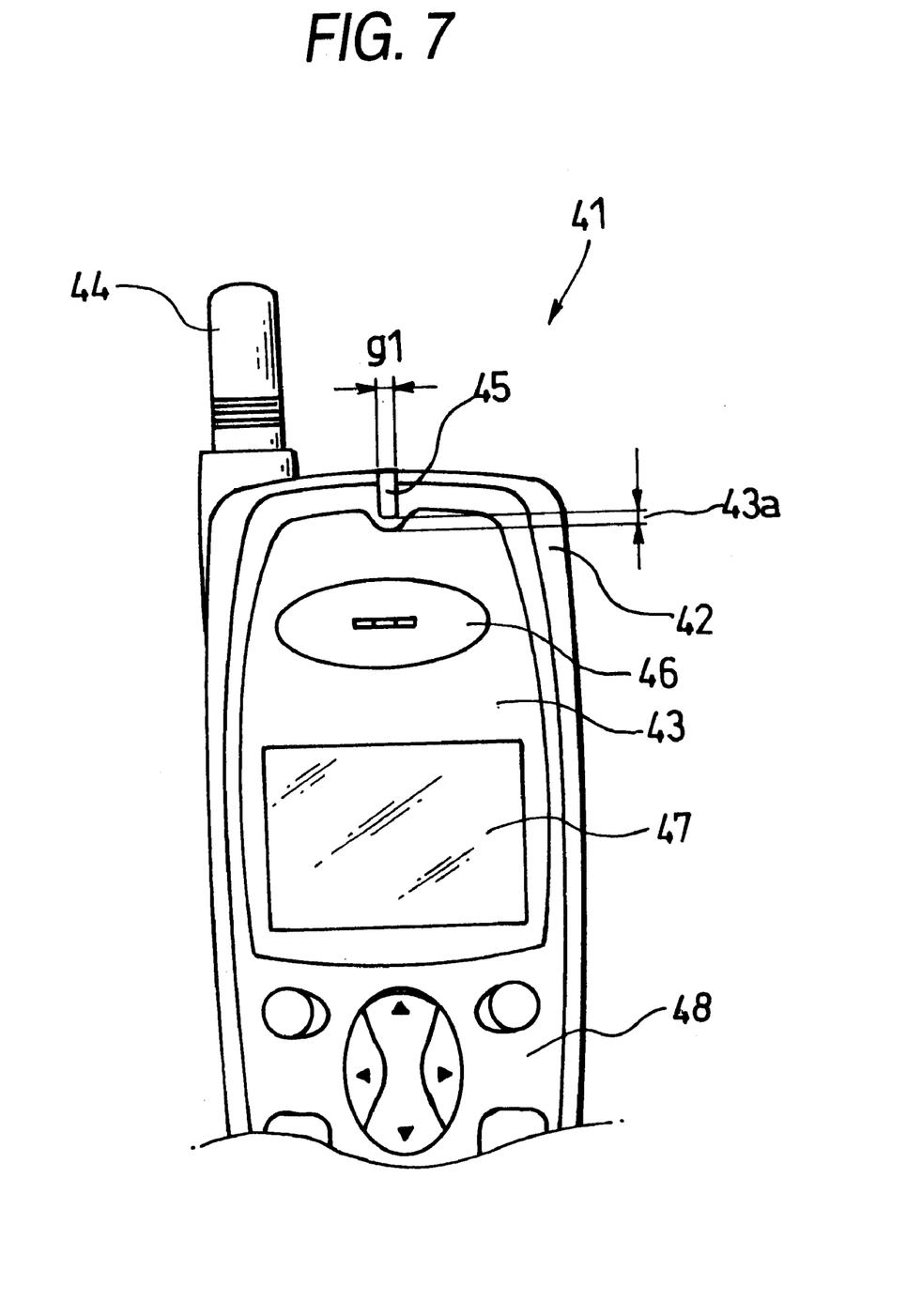
FIG. 7 is a plan view showing an example of a conventional portable communication device.

FIG. 7 shows an external appearance of conventional portable communication device 41 having a transmitting circuit and a receiving circuit inside a housing 42 made of a synthetic resin. An LCD panel 43 is fitted into and attached with a part of the housing 42. A stretchable antenna 44 is provided in the upper part of the housing 42. In the vicinity of the stretchable antenna 44, an indicator 45 indicating a light is provided in the upper end central part of the LCD panel 43, so as to inform the user of the receipt of the electric waves. Though a speaker portion 46 is provided below the indicator 45, a speaker is mounted inside the housing 42. A display portion 47 having a liquid crystal panel displays the phone number of the communication counterpart, or the like. An operation portion 48 is for various kinds of operations, such as the operation of calling the communication counterpart.

Figure 8:
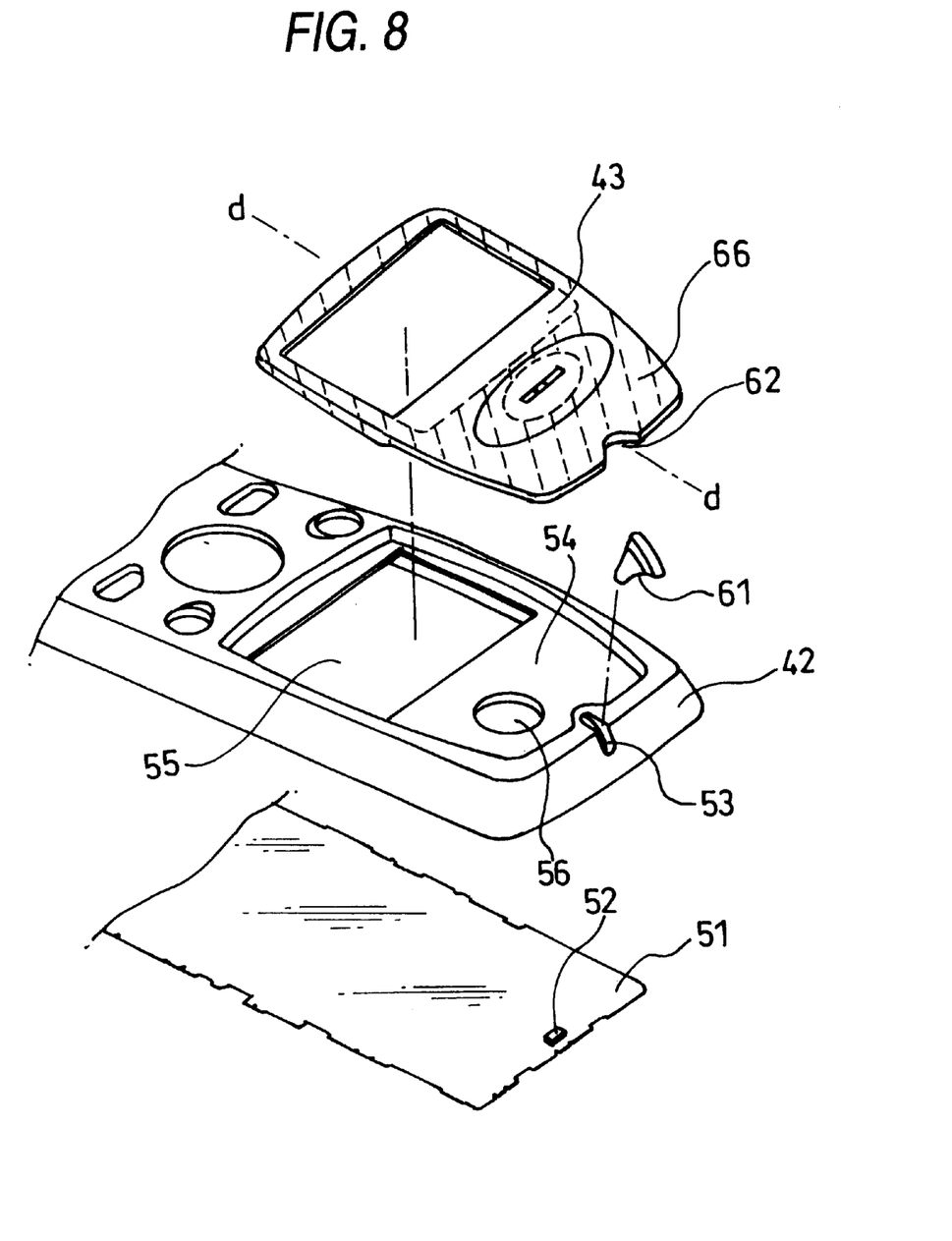
FIG. 8 is an exploded perspective view showing a configuration of the conventional portable communication device.

The internal configuration of the portable communication device 41 will be described. As shown in FIG. 8, a light emitting member 52 such as a light emitting diode is fixed on one end of a printed board 51. The printed board 51 is mounted below the housing 42 shown in the middle part of FIG. 9 such that the light emitting member 52 faces to a hole portion 53 formed on the end portion of the housing 42 in the mounted state. A fitting portion 54 is concavely formed on the upper surface of the housing 42 with a rectangular shape when viewed from above. The LCD panel 43 shown in the upper part of FIG. 8 is fitted into and attached with the fitting portion 54.

The fitting portion 54 formed in the housing 42 has a fitting hole 55 for positioning the liquid crystal panel having the display portion 47 and a fitting hole 56 for positioning the speaker.

On the other hand, a notch portion 62 is formed on one end of the LCD panel 43 for fitting with a lens 61. A double coated adhesive material 66 is attached on the rear side of the LCD panel 43, that is, at the position on the lower side marked with slant lines in FIG. 9 so that the LCD panel 43 is fitted into the fitting portion 54 as well as attached with the double coated adhesive material 66 in mounting the LCD panel 43 in the housing 42.

Figure 9:
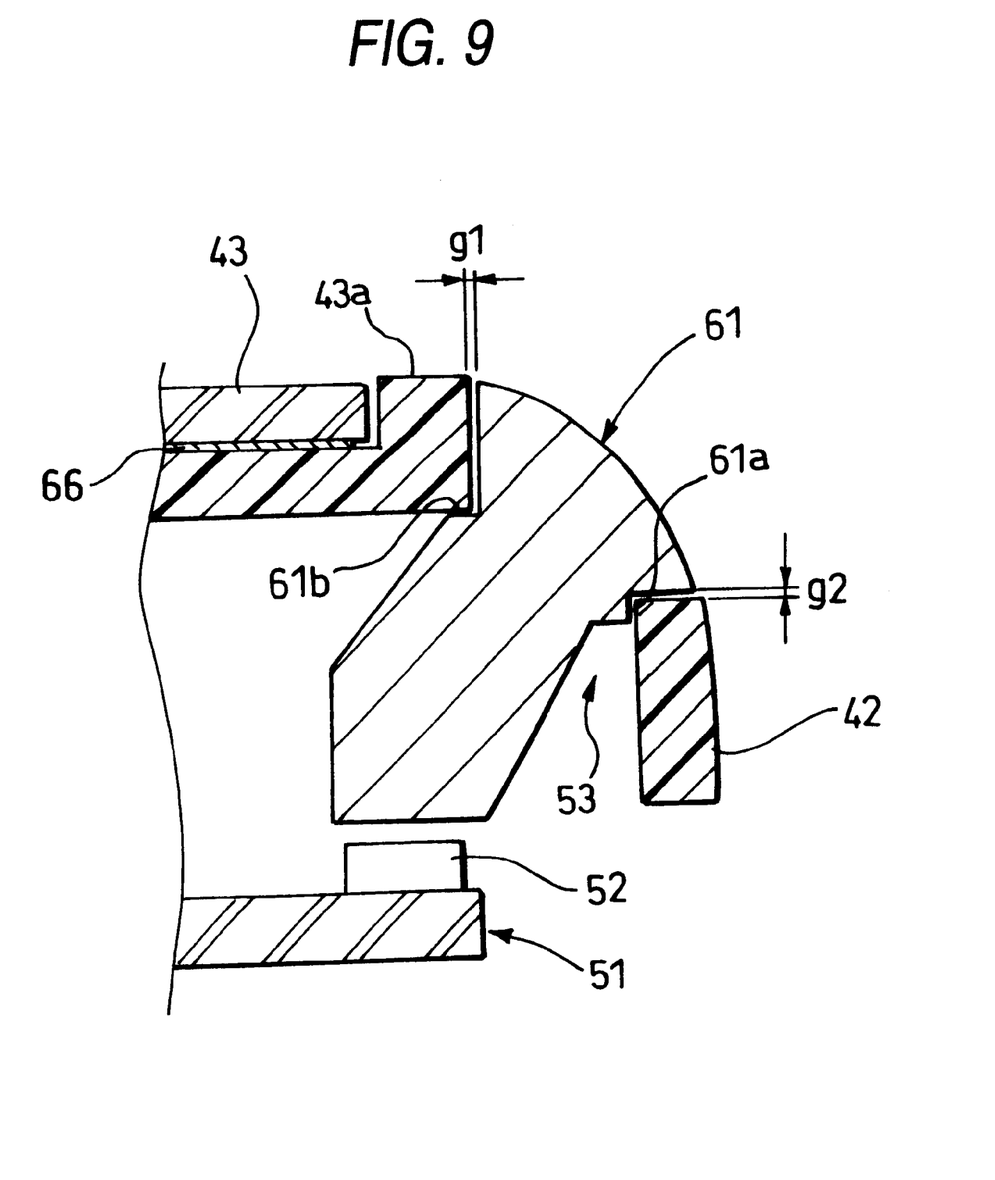
FIG. 9 is cross section of lens assembly.

An assembled structure of the housing 42, the LCD panel 43 and the lens 61 will be described with reference to FIG. 9. FIG. 9 shows the cross-sectional view at the position along the line d—d in FIG. 8, in which the housing 42, the LCD panel 43 and the lens 61 are assembled.

The lens 61, which is prepared by integral molding of an acrylic material containing a dispersing agent forms the indicator 5 together with the light emitting member 52. The lens 61 has a plate-like shape when viewed from above, and a ginkgo leaf-like shape when viewed from the side as shown in FIG. 9.

In the condition that the housing 42, the LCD panel 43 and the lens 61 are assembled, the lower end portion of the lens 61 is adjacent to the light emitting member 52 so that the light emitted from the light emitting member 52 is transmitted and observed visibly from above the lens 61.

The lens 61 is engaged with the hole portion so as to be mounted on the housing 42. In mounting, a first nail portion 61a and a second nail portion 61b formed in the lens 61 are engaged with the inner circumference of the hole portion 53 for stopping the lens 61 and preventing the lens 61 from being removed from the housing 42.

With the device for mounting the lens 61, in the case fitting gaps g1 and g2 between the housing 42 and the lens 61 are large, a light may be leaked, or the lens 61 may backlash In order to solve the problems, it is necessary to minimize the fitting gaps or adopt press fitting. In either case, a high size accuracy is required of each of the hole portion 53 and the lens 61 so that production of a mold and administration of molding irregularity become difficult.

Since the lens 61 is held by the first and second nail portions 61a and 61b, the strength of holding the lens 61 is weak. Therefore, in the case that the portable communication device is dropped, the lens 61 may break due to the load applied thereon by the dropping impact. In order to solve the problem, the first and second nail portions 61a and 61b may be provided with a larger size so as to enlarge the hooking area onto the housing 42. However, with a larger hooking area, the assembly becomes difficult.

However, since the first and second nail portions 61a and 61b are engaged with the housing 42, as shown in FIGS. 9 and 11, the end portion 43a of the housing 42 needs to be disposed between the lens 61 and the LCD panel 43. Therefore, design is limited in the case the LCD panel 43 and the lens 61 are expressed integrally.

SUMMARY OF THE INVENTION

In view of the above circumstances, the object of the present invention is to provide portable communication device having a structure for mounting a lens capable of simplifying the size accuracy of parts, having the excellent assembling property, and improving the holding force against the external force and freedom in design.

In order to solve the problems, according to a first aspect of the present invention, there is provided a lens holding device for portable communication device comprising a housing partially provided with a concave portion, a panel to be fitted with the concave portion, a light emitting member for emitting a light subject to receipt, and a lens for guiding the light emitted from the light emitting member, wherein the lens is fitted into the panel as well as interposed between the housing and the panel.

Moreover, according to a second aspect of the present invention, collar portions are formed in the lens so that the collar portions are interposed between the housing and the panel.

According to the above configurations, since the collar portions are interposed between the housing and the panel fixed on the housing so as to be integrated, compared with the configuration of inserting the lens into the hole portion formed in the housing for engaging by the nail portions, the size administration of the parts, such as the lens can be simplified so that fall-off by the external force can be prevented as well as various expressions can be enabled in terms of design.

Furthermore, according to third aspect of the present invention, one of the collar portions is formed as a ring-like fitting spring portion so that an engaging projection formed in the panel is inserted through the fitting spring portion. According to the configuration, since the engaging projection is inserted through the fitting spring portion, the lens cannot loose out at all.

Moreover, according to a fourth aspect of the present invention, the collar portions are bonded using a double coated adhesive material preliminary attached on the panel. According to the configuration, assembly of the lens and the panel, and, the housing can further be reinforced so that in addition to prevention of loosing out of the lens, backlash can be prevented completely.

DETAILED DESCRIPTION OF THE PRESENT INVENTION

The present invention will be described in detail with reference to the accompanying drawings.
(First Embodiment)

Figure 1:
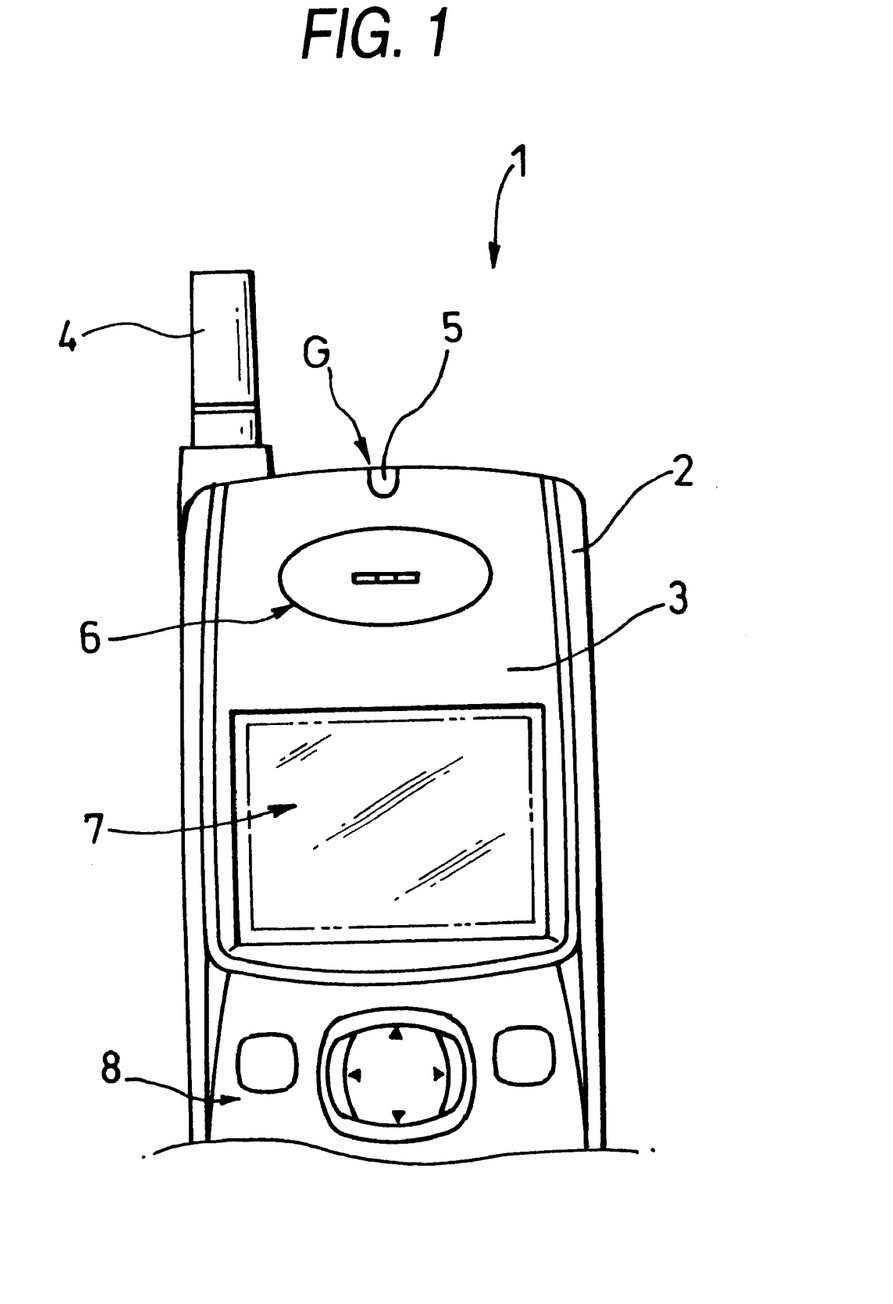
FIG. 1 is a plan view showing a first embodiment of a portable communication device of the present invention.
Figure 2:
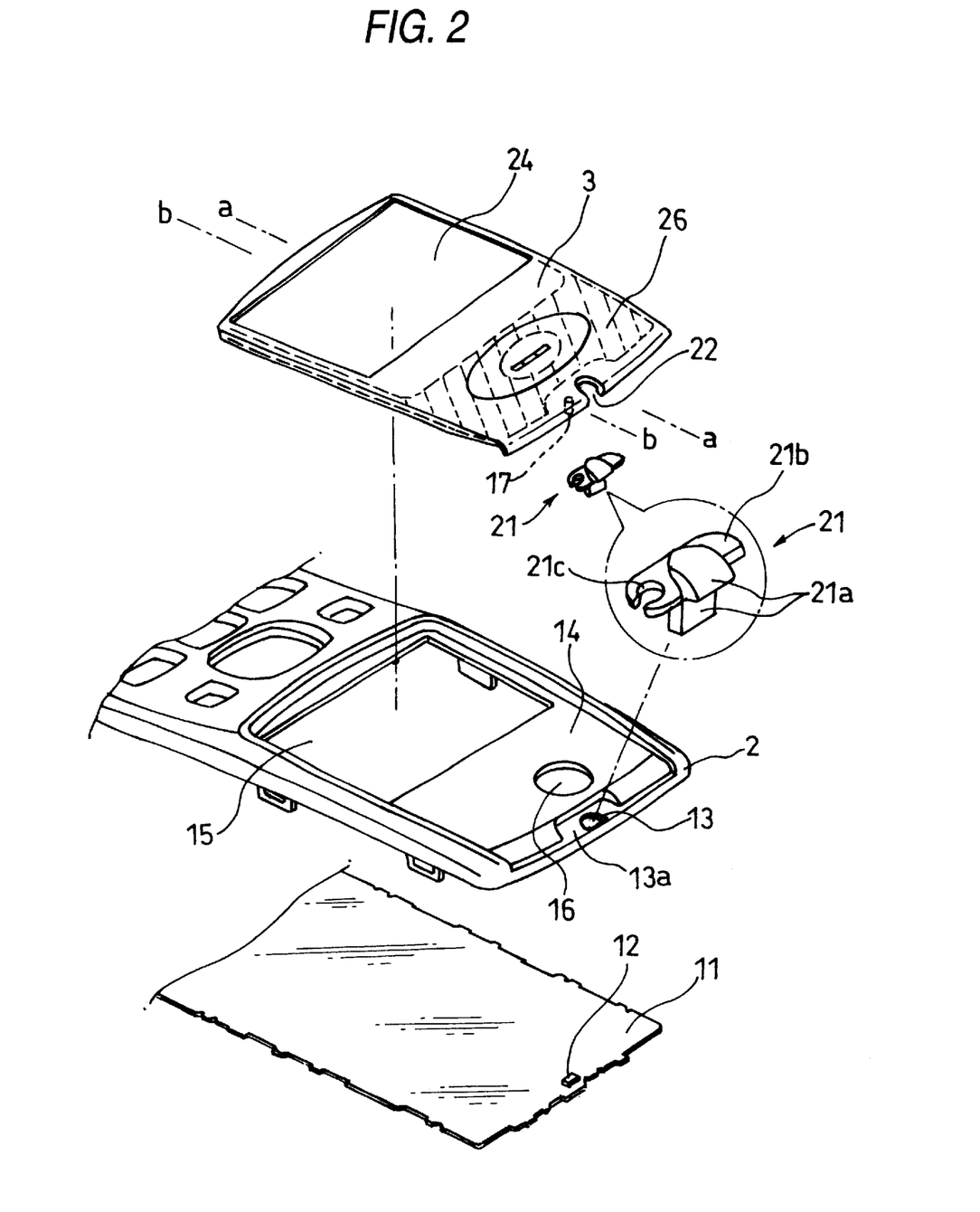
FIG. 2 is an exploded perspective view showing each member of the portable communication device of the present invention.
Figure 3:
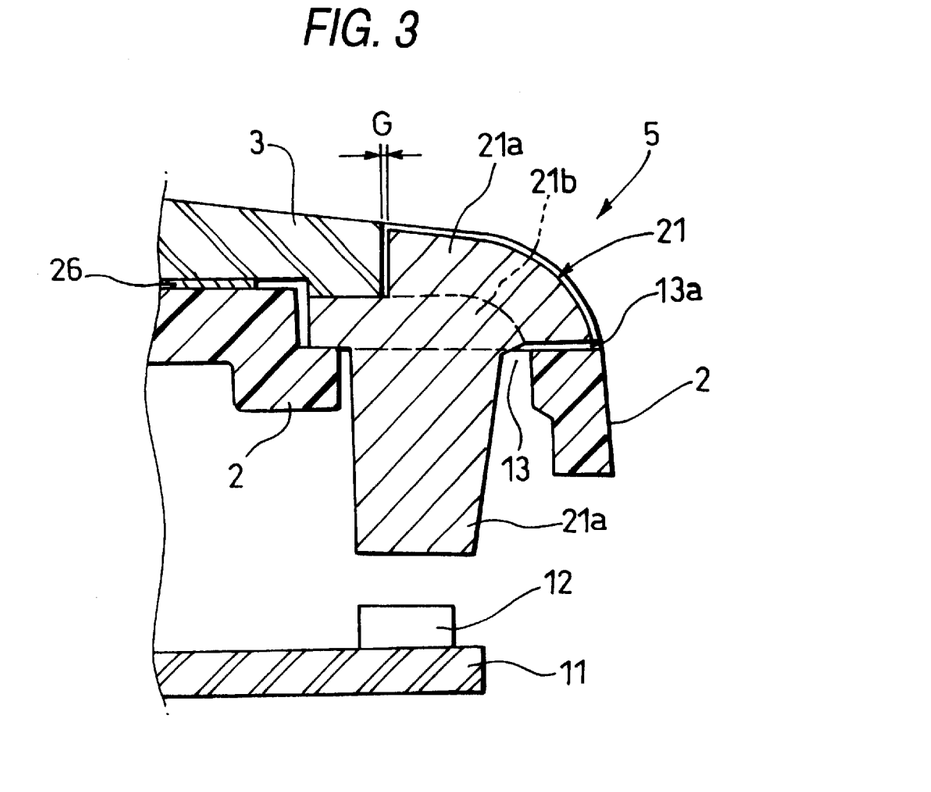
FIG. 3 is a cross-sectional view taken on the line a—a of FIG. 2.
Figure 4:
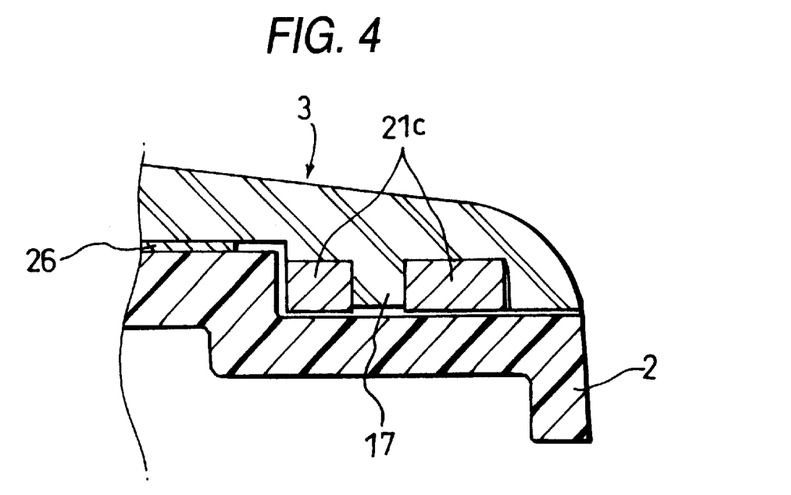
FIG. 4 is a cross-sectional view taken on the line b—b of FIG. 2.

A first embodiment of the portable communication device according to the invention will be described with reference to FIGS. 1 to 4. FIG. 1 is a plan view showing the external configuration of the portable communication device. FIG. 2 is an exploded perspective view showing a part of the portable communication device. FIG. 3 is a cross-sectional view taken on the line a—a in FIG. 2. FIG. 4 is a cross-sectional view taken on the line b—b in FIG. 2.

The entire configuration of the portable communication device will be explained with reference to FIG. 1, and the device for holding the lens, or the like, will be explained with reference to FIG. 2 and the subsequent drawings.

The portable communication device 1 comprises a transmitting and receiving circuit stored in a housing 2 made from a synthetic resin. An LCD panel 3 is fitted into and attached with a part of the housing 2. A stretchable antenna 4 is provided in the upper part of the housing 2. In the vicinity of ht estretchable antenna 4, an indicator 5 for indicating light is provided in the upper end central part of the LCD panel 3 so as to inform an user of receipt of the electric waves. The indicator 5 comprises a receipt range and a light emitting member such as a light emitting diode provided on the rear side thereof. The configuration of the indicator 5 and the light emitting member will be described later in detail as the device for holding the lens.

Though a speaker portion 6 is provided below the indicator 5, a speaker is mounted inside the housing 2. A display portion 7 having a liquid crystal panel displays the phone number of the communication counterpart, or the like. An operation portion 8 is for various kinds of operations, such as the operation of calling the communication counterpart.

The internal configuration of the portable communication device 1 will be explained. As shown in FIG. 2, a light emitting member 12 such as a light emitting diode is fixed on one end of a printed board 11. The printed board 11 is mounted below the housing 2 shown in the middle part of FIG. 2 such that the light emitting member 12 corresponds to a hole portion 13 formed on the end portion of the housing 2 in the mounted state A fitting portion 14 is concavely formed with a rectangular planar shape on the upper surface of the housing 2. The LCD panel 3 shown in the upper part of FIG. 2 is fitted into and attached with the fitting portion 14. In the fitting portion 14 formed in the housing 2 are formed a fitting hole 15 for positioning the liquid crystal panel comprising the display portion 7 and a fitting hole 16 for positioning the speaker.

On the other hand, a notch portion 22 is formed on one end of the LCD panel 3 for fitting with a lens 21 shown enlarged partially. The notch portion 22 is formed with a U-shape when viewed from above, with a pin-like engaging projection 17 formed on the rear surface in the vicinity thereof. In the LCD panel 3 are formed a fitting hole 24 corresponding to the fitting hole 15 and a voice hole 16 for conveying the sound from the speaker.

A double coated adhesive material 26 is attached on the rear side of the LCD panel 3, that is, at the position on the lower side marked with slant lines in FIG. 2 so that the LCD panel 3 is fitted into the fitting portion 14 as well as attached with the double coated adhesive material 26 in mounting the LCD panel 3 in the housing 2.

The lens 21 will be explained. The lens 21 is prepared by integral molding of an acrylic material containing a dispersing agent, provided with a property of transmitting and dispersing a light. The lens 21 comprises a longitudinal light transmitting portion 21a with a U-shape when viewed from above, projecting downward, a collar portion formed overhanging on one side of the light transmitting portion 21a, and a ring-like fitting spring portion 21c having elasticity, formed overhanging from the other side of the light transmitting portion 21a.

The housing 2, the LCD panel 3 and the lens 21 are assembled as follows. That is, as shown in FIGS. 2 and 3, the vicinity of the hole portion 13 is a flat portion 13a having a gap with respect to the fitting portion 14, with an area and a shape capable of fitting with the collar portion 21b and the fitting spring portion 21c. The hole portion 13 is linear on one side and arc-like on the other side. The cross-sectional shape of the projecting portion formed downward on the light transmitting portion 21a corresponds with the shape of the hole portion 13.

Therefore, in inserting the projecting portion formed downward on the light transmitting portion 21a comprising the lens 21 into the hole portion 13, the collar portion 21b and the fitting spring portion 21c are fitted with the flat portion 13a so that mistaken insertion can be prevented. As a result, assembly and positioning of the lens 21 in the housing 2 can be executed at the same time.

The backing paper (not illustrated) of the double coated adhesive material 26 preliminary attached on the rear side of the LCD panel 3 is peeled off so that the LCD panel 3 is fitted and bonded with the fitting portion 14. At the time, since the lens 21 is positioned as mentioned above, by assembling the LCD panel 3, the engaging projection 17 formed downward on the lower side of the LCD panel 3 is inserted through the fitting spring portion 21c formed like a ring as well as the top portion of the light transmitting portion 21a, that is, the U-shaped projection is fitted with the U-shaped notch portion 22 so as to complete assembly of the housing 2, the LCD panel 3 and the lens 21.

The assembly state will be explained. As shown in FIG. 3, the light transmitting portion 21a is inserted through the hole portion 13, with the lower end thereof positioned immediately above the light emitting member 12 and the top portion exposed from the U-shaped notch portion 22 at the position along the line a—a shown in FIG. 2. Therefore, when the light emitting member 12 emits a light at the time of receipt, the light transmits through the light transmitting portion 21a so as to be observed visibly by the user.

On the other hand, a part of the collar portion 21b positioned above the flat portion 13a overhangs between the housing 2 and the LCD panel 3 so as to be interposed between the housing 2 and the panel 3. Moreover, since the engaging projection 17 is inserted through the fitting spring portion 21c, in combination with the interposition of the collar portion 21b, the lens 21 as a whole can be fixed firmly between the housing 2 and the LCD panel 3.

As heretofore mentioned, according to this embodiment, the collar portion 21b and the fitting spring portion 21c of the lens 21 are interposed between the housing 2 and the LCD panel 3 as well as the fitting spring portion 21c is engaged by the engaging projection 17 formed on the LCD panel 3. Besides, the light transmitting portion 21a comprising the lens 21 is fitted with the hole portion 13 formed in the LCD panel 3 so as to be exposed on one end of the LCD panel 3.

Accordingly, even in the case there is a size error in the lens 21, the lens 21 can be assembled easily without generation of loosing out or backlash.

Moreover, since the holding strength is improved according to interposition and engagement of the collar portion 21b and the fitting spring portion 21c, even in the case an impact is applied by an unexpected incident, such as inadvertent dropping of the portable communication device 1, drop-off or loosing out of the lens 21 can be prevented. Furthermore, since leakage of a light from the fitting gap G can be guided via the collar portion 21b, the light irregularity can be reduced by the dispersing agent in the lens 21. Moreover, since the lens 21 is engaged by the LCD panel 3, an integrated external appearance with a high quality design can be realized.

(Second Embodiment)

Figure 5:
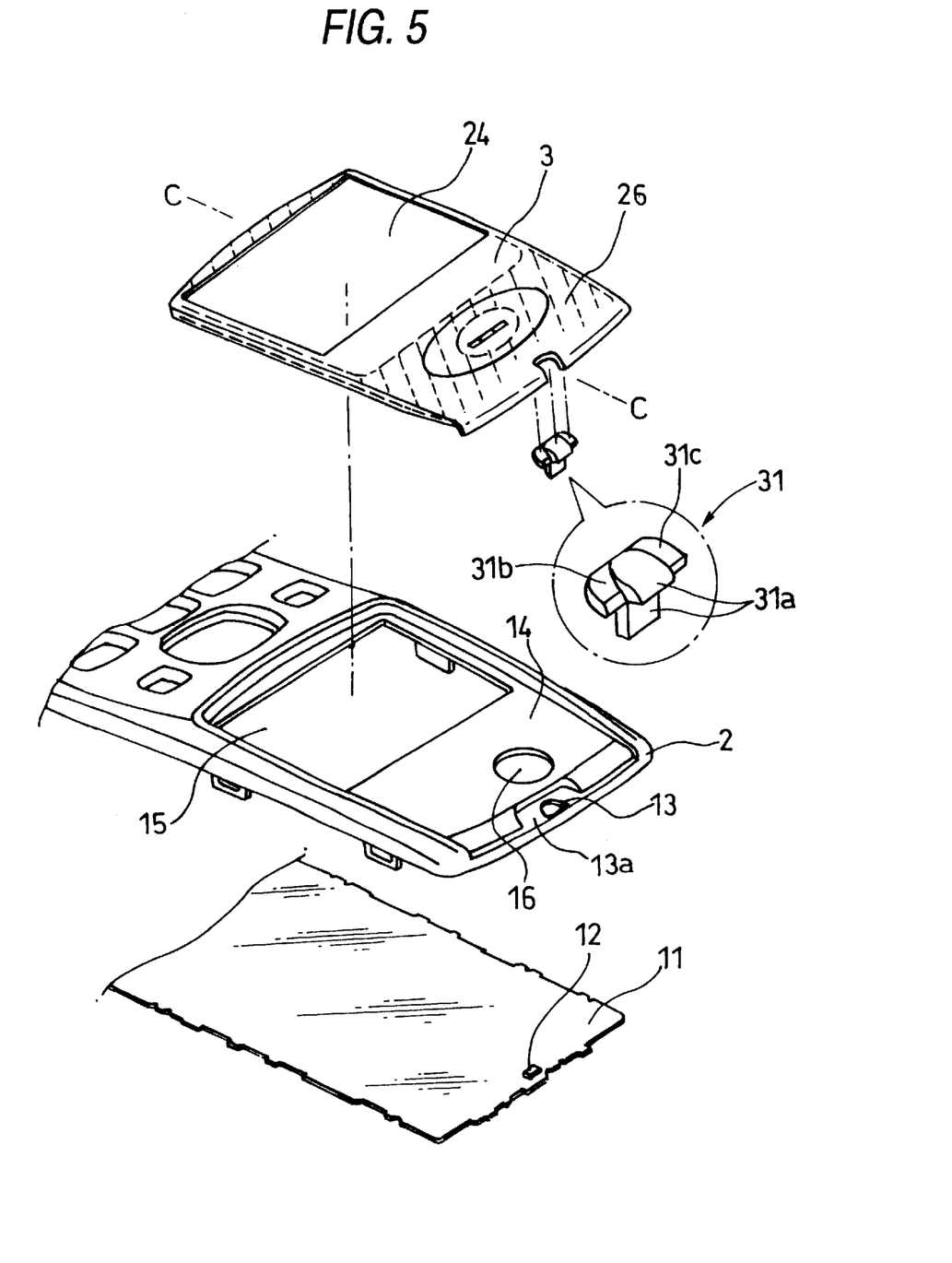
FIG. 5 is an exploded perspective view showing each member of a second embodiment of a portable communication device according to the present invention.

A second embodiment of the invention will be explained with reference to FIGS. 5 and 6. This embodiment differs from the first embodiment mainly in that the shape of the lens is changed and assembly is executed using an adhesive material. Therefore, the members with the same function as in the first embodiment are applied with the same numeral and further explanation is not given.

A lens 31 according to this embodiment comprises a light transmitting portion 31a provided similarly as in the first embodiment, and collar portions 31b, 31c formed symmetrically to the right and left, overhanging therefrom on both sides. On the other hand, a hole portion 13 is formed on one end of the LCD panel 3 similar to the above, but without the engaging projection 17 provided in the first embodiment. A double coated adhesive material 26 is actached preliminary on the rear side of the LCD panel 3 to the rim portion of the notch portion 22. A flat portion 13a is formed in the vicinity of the hole portion 13 similar to the above.

Figure 6:
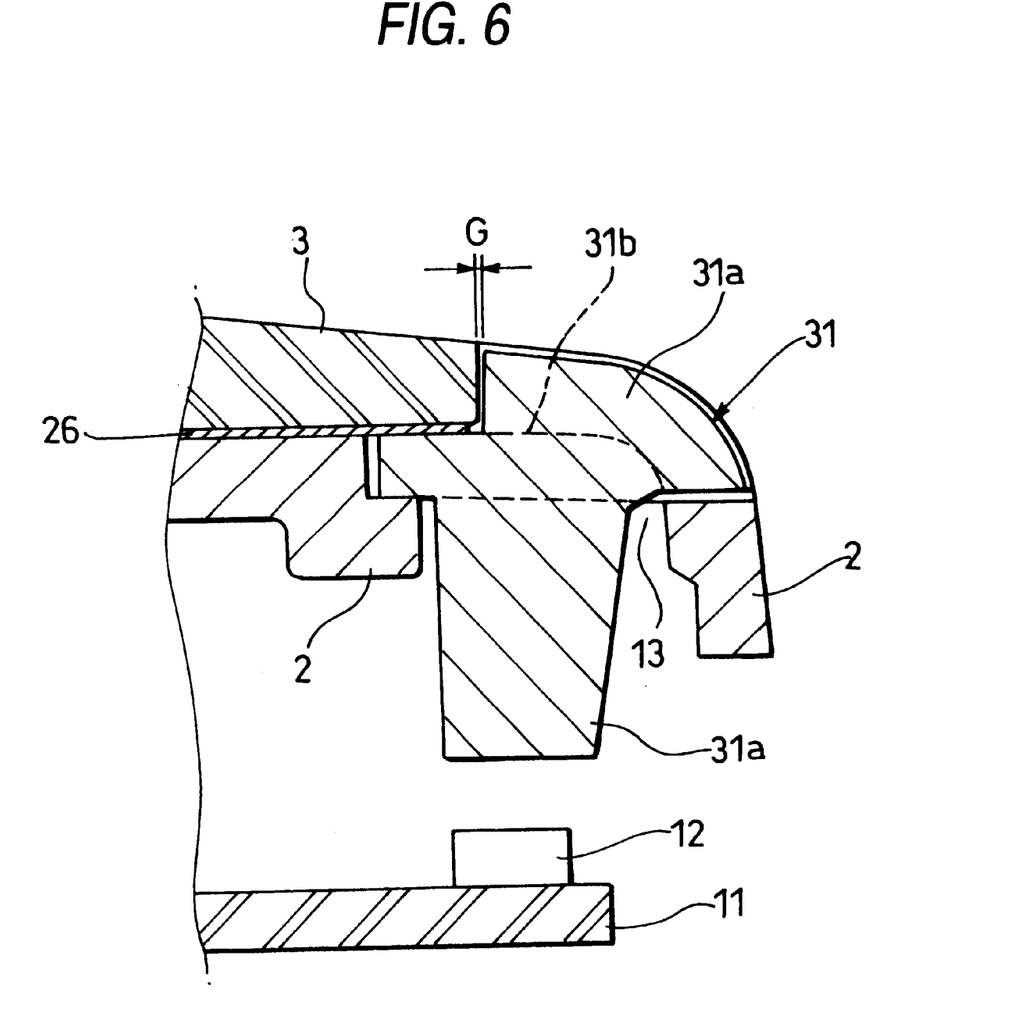
FIG. 6 is a cross-sectional view taken on the line c—c of FIG. 5.

In the state the housing 2, the LCD panel 3 and the lens 31 are assembled, the collar portions 31b, 31c are interposed between the flat portion 13a and the LCD panel 3 as shown in FIG. 6. Besides, since apart of the collar portions 31b, 31c are bonded with the double coated adhesive material 26, the housing 2, the LCD panel 3 and the lens 31 are integrated firmly, Accordingly, also in this embodiment, the housing 2, the LCD panel 3 and the lens 31 are integrated firmly as well as assembly of the lens 31 can be simplified. Moreover, since a light emitted from the light emitting member 12 transmits the light transmitting portion 31a similar to the above, receipt can be observed visibly by the user as well as leakage of a light at the gap G can be dispersed similar to the above.

That is, also in this embodiment, the effects the same as above such as improvement of size accuracy of each member, the assembling property, expression of design, or the like, can be obtained.

Although an example of the LCD panel has been presented in the above-mentioned embodiments, the display portion of the invention is not limited to the LCD panel.

The portable communication device according to the invention has the following effects.

(1) A light transmitting portion, a collar portion and a fitting spring portion are provided in a lens. A light emitted from a light emitting member is guided via the light transmitting portion On the other hand, since a light leaked from a gap formed with respect to an LCD panel comes out via the collar portion, it is dispersed by the dispersing agent contained in the lens so that the light irregularity can be reduced.

(2) Since the lens and the housing, and the LCD panel are assembled by engagement of an engaging projection provided in the LCD panel and the fitting spring portion provided in the lens, interposition of the spring portion between the housing and the LCD panel, and further, bonding of an adhesive material preliminary attached on the LCD panel and the collar portion, the holding size accuracy of the lens can be administered easily and assembly can be executed conveniently from above the panel.

(3) Since the lens is assembled by engagement of an engaging projection provided in the LCD panel and the fitting spring portion provided in the lens, interposition of the spring portion between the housing and the LCD panel, and further, bonding of an adhesive material preliminary attached on the LCD panel and the collar portion, the holding strength of the lens can be improved remarkably. Therefore, even in the case pressure or an undesired impact is applied, damage or loosing out of the lens can be prevented.

(4) Since the lens is assembled by engagement of an engaging projection provided in the LCD panel and the fitting spring portion provided in the lens, interposition of the spring portion between the housing and the LCD panel, and further, bonding of an adhesive material preliminary attached on the LCD panel and the collar portion, the LCD panel and the lens can be integrated so that an integrated external appearance with a high quality design can be realized.

What is claimed is:

1. A lens holding device for portable communication device comprising:

a housing partially defining a concave portion;

a panel fitted into the concave portion of the housing;

a light emitting member disposed in the housing, for emitting light when receiving electric waves; and a lens for guiding the light emitted from the light emitting member to outside of the housing, wherein the lens is engaged with the panel, and the lens is sandwiched between the housing and the panel.

2. The lens holding device according to claim 1, wherein the lens has a color portion sandwiched between the housing and the panel.

3. The lens holding device according to claim 2, wherein the color portion has a plurality of colors;

one of the plurality of colors has a hole;

the panel has a protrusion; and the protrusion of the panel is engaged with the hole of the one of the plurality of colors.

4. The lens holding device according to claim 2, wherein the collar portion and the panel are bonded to each other by a double-face coated adhesive material preliminary attached on the panel.

* * * * *